(12) United States Patent
Sharifi et al.

(10) Patent No.: US 8,838,609 B1
(45) Date of Patent: Sep. 16, 2014

(54) IDF WEIGHTING OF LSH BANDS FOR LIVE REFERENCE INGESTION

(71) Applicant: Google Inc., Mountain View, CA (US)

(72) Inventors: Matthew Sharifi, Zurich (CH); Gheorghe Postelnicu, Zurich (CH)

(73) Assignee: Google Inc., Mountain View, CA (US)

( * ) Notice: Subject to any disclaimer, the term of this patent is extended or adjusted under 35 U.S.C. 154(b) by 150 days.

(21) Appl. No.: 13/648,511

(22) Filed: Oct. 10, 2012

(51) Int. Cl.
*G06F 7/00* (2006.01)
*G06F 17/30* (2006.01)

(52) U.S. Cl.
USPC ......................................................... 707/747

(58) Field of Classification Search
None
See application file for complete search history.

(56) References Cited

U.S. PATENT DOCUMENTS

| | | | | |
|---|---|---|---|---|
| 8,452,106 | B2* | 5/2013 | Ke et al. | 382/195 |
| 8,625,033 | B1* | 1/2014 | Marwood et al. | 348/701 |
| 2009/0052784 | A1* | 2/2009 | Covell et al. | 382/209 |

OTHER PUBLICATIONS

Liu et al, "Web-based Real Time Content Processing and Monitoring Service for Digital TV Broadcast", AT&T Labs 2010, 6 pages.*
Shazam, http://www.shazam.com, Last accessed Apr. 24, 2012.
D. Bhat, et al. Ordinal Measures for Visual Correspondence. In CVPR'96. 1996 IEEE.
J. Friedman. An Overview of Predictive Learning and Function Approximation. Technical Report 112, Sep. 1994. Laboratory for Computational Statistics. Department of Statistics, Stanford University. In From Statistics to Neural Networks 1994.
P. Diaconis, et al. Spearman's footrule as a measure of disarray. Stanford, California and Murray Hill, N.J. Received Aug. 1976. Revised Apr. 1977. In J. Roy. Statistical Society 1977.
A. Maturi, et al. A New Weighted Rank Correlation. In J. Mathematics and Statistics, Oct. 1, 2008.
J. Pinto Da Costa, et al. A Weighted Rank Measure of Correlation. In Australian New Zealand Journal of Statistics 47(4), 2005, 515-529.
G. Shieh. A weighted Kendall's tau statistic. In Statistics & Probability Letters 39 (1998) 17-24.
M. Ozuysal, et al. Fast Keypoint Recognition in Ten Lines of Code. In CVPR 2007.
Y. Lifshits, et al. Combinatorial Algorithms for Nearest Neighbors, Near-Duplicates and Small World Design. In SODA 2009.
D. Tschopp, et al. Approximate nearest neighbor search through comparisons. In ArXiv preprint Sep. 11, 2009.
K. Eshghi, et al. Locality sensitive hash functions based on concomitant rank order statistics. In 14th ACM SIGKDD Conference on Knowledge Discovery & Data Mining (KDD'08), Aug. 2008. Posting Date Jul. 6, 2008.
A. Broder. On the resemblance and containment of documents. In SEQUENCES 1997.
A. Broder, et al. Min-wise independent permutations. In STOC 1998.

(Continued)

*Primary Examiner* — Uyen Le
(74) *Attorney, Agent, or Firm* — Amin, Turocy & Watson, LLP

(57) ABSTRACT

Down scoring overcrowded bands via IDF weighting scores provides a soft way to reduce the effect of common bands from Locality Sensitive Hashing (LSH) processes. An index component indexes live video references of a live streaming infrastructure pathway process in a reference index. A scoring component scores a set of bands with a set of inverse document frequency (IDF) weighting scores in the reference index. A high score is generated for bands that are featured in a small number of references and a low score is generated for bands featured in a high number of references.

20 Claims, 10 Drawing Sheets

(56) References Cited

OTHER PUBLICATIONS

S. Baluja, et al. Boosting Sex Identification Performance. In IJCV 2007.
M. Ozuysal, et al. Feature harvesting for tracking-by-detection. In ECCV 2006.
O. Pele, et al. Robust real time pattern matching using bayesian sequential hypothesis testing. In PAMI 2008.
R. Zabih, et al. Non-parametric local transforms for computing visual correspondence. In ECCV 1994.
V. Lepetit. Keypoint recognition using randomized trees. In PAMI 2006.
P. Indyk, et al. Approximate nearest neighbors: towards removing the curse of dimensionality. In STOC 1998, Dallas,l Texas. ACM 1998.
Y. Weiss, et al. Spectral Hashing. In NIPS 2009.
R. Lin, et al. SPEC Hashing: Similarity Preserving algorithm for Entropy-based Coding. In CVPR 2010.
D. Lowe. Object recognition from local scale-invariant features. Proceedings of the International Conference on Computer Vision, Corfu (Sep. 1999). In IJCV 1999.
B. Wang, et al. Large-scale duplicate detection for web image search. In ICME 2006.
X.J. Wang, et al. Annosearch: Image autoannotation by search. In CVPR 2006.
S. Winder, et al. Picking the best Daisy. In CVPR 2009.
D. Nister, et al. Scalable recognition with a vocabulary tree. In CVPR 2006.
E. Tola, et al. A fast local descriptor for dense matching. CVPR 2008.
E. Tola, et al. DAISY: an Efficient Dense Descriptor Applied to Wide Baseline Stereo. IEEE Transactions on Pattern Analysis and Machine Intelligence, vol. 32, No. 5, May 2010, 815-830. In PAMI 2010.
R.E. Fan, et al. LIBLINEAR: A Library for Large Linear Classification. Journal of Machine Learning Research 9 (2008) 1871-1874.
K. Yu, et al. Nonlinear Learning using Local Coordinate Coding. In NIPS 2009.
J. Zhang, et al. Local Features and Kernels for Classification of Texture and Object Categories: A Comprehensive Study. International Journal of Computer Vision 2007.
Lu, Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.
Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.
Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.
Lu, Jian, "Video fingerprinting for copy identification: from research to industry applications," Proceedings of SPIE—Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.
Covell, et al., "LSH Banding for Large-Scale Retrieval with Memory and Recall Constraints," 4 pages.
Unpublished U.S. Appl. No. 13/415,704, filed Mar. 3, 2012, 41 pages.

* cited by examiner

REFERENCE INDEX

| LSH KEY | VIDEO@(OFFSET) |
|---|---|
| 65 22 A5 B1 | A@(0), C@(7, 142, 156, 253), D@(34, 42, 71, 123, 124, 125),... |
| B2 72 A5 1C | A@(1), B@(0), C@(1, 12, 14), D@(8), F@(10, 125, 124, 126, 127,...) |
| 24 56 39 12 | B@(1) |
| | |
| A5 43 21 C2 | A@(1) |
| 00 00 00 0A | BL1 |
| 23 43 44 D2 | A@(0), B@(0), G@(34, 51, 111, 154, 155, 156, 157, 186, 192, 201,...) |
| 11 34 55 56 | B@(1) |
| | |
| E1 42 53 22 | A@(0) |
| 55 21 98 A1 | A@(1) |
| 11 34 55 56 | B@(0) |
| 11 53 B4 CA | B@(0) |
| 00 00 00 0B | BL2 (G, 26) |

BAND 0 / BAND 1 (602) / BAND 2 (604)

FIG. 6

IDF WEIGHTING OF LSH BANDS FOR LIVE REFERENCE INGESTION

CROSS-REFERENCE TO RELATED APPLICATIONS

The subject patent application is related to co-pending U.S. patent application Ser. No. 13/415,704, filed on Mar. 8, 2012, entitled "AUDIO IDENTIFICATION USING ORDINAL TRANSFORMATION," the entirety of which is incorporated herein by reference.

TECHNICAL FIELD

This disclosure relates generally to receiving and processing video streams for distribution, and in particular to Inverse Document Frequency (IDF) weighting of Locality Sensitive Hashing bands for live reference ingestion.

BACKGROUND

Media hosting services that allow users to upload multimedia content (e.g., audio/video content) for mass viewing allow easy distribution of global events regardless of demographic agenda. As volume of hosted media content continues to grow, management of ownership rights pertaining to hosted media content has become an increasingly challenging problem for hosting services. For music content embedded in an audio or video file, songwriters, publishers, and recording labels are just some of the different entities that may hold rights to the media content. For appropriate payments to be made to copyright holders, media content needs to be correctly identified. However, unlike television and radio environments where content is typically identified prior to airing, media hosting services often handle user-provided media content that may initially be unidentified. Manual identification of such media content becomes onerous when media hosting sites receive thousands or millions of new media uploads every day. Generally, most automated mechanisms require the entire content in advance. However, right holders cannot always provide the full content upfront, if, for example, in the case of a live event stream, and thus, improved mechanisms are sought after for modern media hosting services.

SUMMARY

The following presents a simplified summary of various aspects of this disclosure in order to provide a basic understanding of such aspects. This summary is not an extensive overview of all contemplated aspects, and is not intended to neither identify key or critical elements nor delineate the scope of such aspects. Its purpose is to present some concepts of this disclosure in a simplified form as a prelude to the more detailed description that is presented later.

Systems and methods disclosed herein relate to indexing live media stream within an ingestion pathway and scoring Locality Sensitive Hashing (LSH) bands of the media references according to an Inverse Document Frequency (IDF) weighting score. By giving high scores for bands that feature in a small number of references, and low scores for bands that feature in a many reference, the effect of very common bands in a media matching system or fingerprinting scheme can be reduced to ensure high precision matching.

In an example embodiment, a system comprises a memory that stores computer executable components. A processor executes the computer executable components stored in the memory. An index component indexes live references of a live streaming infrastructure process in a reference index. A scoring component scores a set of bands via a set of Inverse Document Frequency (IDF) weighting scores in the reference index. The scoring component generates a first IDF weighting score for a first set of bands that are featured in less than a first predetermined number of references, and generates a second IDF weighting score to a second set of bands that are featured in more than a second predetermined number of references.

In another embodiment, a method uses a processor to execute computer executable instructions stored in a memory to perform various acts. The method includes indexing video references in a reference index and scoring a set of bands via a set of inverse document frequency (IDF) weighting scores in the reference index. The act of scoring includes generating a first IDF weighting score to a first set of bands of the set of bands that have a first predetermined number of band references in less than a first predetermined number of references, and generating a second IDF weighting score to a second set of bands that have a second predetermined number of the band references in more than a second predetermined number of references.

Also disclosed herein is a method using a processor to execute computer executable instructions of a memory. The method includes indexing live video references in a reference index within a live streaming infrastructure pathway. The method further includes scoring a set of bands received in the live streaming infrastructure pathway via a set of inverse document frequency (IDF) weighting scores and storing the set of bands with the IDF weighting scores in the reference index. The scoring comprises down scoring a subset of the set of bands via the IDF weighting scores to reduce a weight of entries within the subset of bands exceeding a predetermined threshold.

The following description and the annexed drawings set forth in detail certain illustrative aspects of this disclosure. These aspects are indicative, however, of but a few of the various ways in which the principles of this disclosure may be employed. This disclosure is intended to include all such aspects and their equivalents. Other advantages and distinctive features of this disclosure will become apparent from the following detailed description of this disclosure when considered in conjunction with the drawings.

BRIEF DESCRIPTION OF THE DRAWINGS

FIG. 6 illustrates examples of a reference index in accordance with various aspects and implementations described herein.

DETAILED DESCRIPTION

Overview

Figure 1:
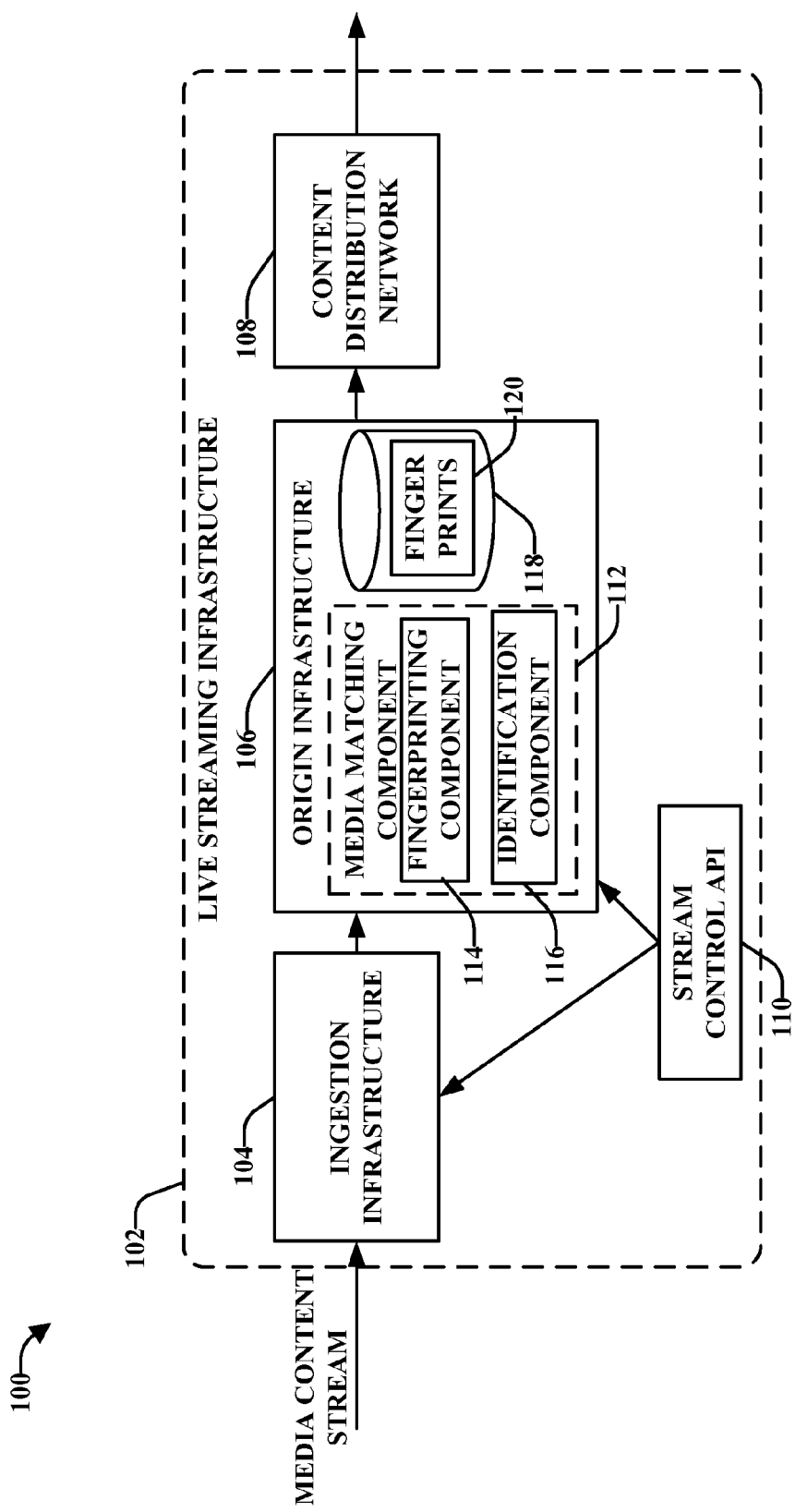
FIG. 1 is a block diagram illustrating an example, non-limiting embodiment of a live streaming infrastructure in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

It is to be appreciated that in accordance with one or more implementations described in this disclosure, users can opt-out of providing personal information, demographic information, location information, proprietary information, sensitive information, or the like in connection with data gathering aspects. Moreover, one or more implementations described herein can provide for anonymizing collected, received, or transmitted data.

In accordance with one or more implementations described in this disclosure, content matching systems include fingerprinting schemes based on a Locality Sensitive Hashing (LSH) index. Inverse Document Frequencies are used to generate an Inverse Document Frequency (IDF) score for video reference bands that are identified in a set of references. The IDF scores operate as IDF weighting scores that are applied to index matches or hits that can be viewed as a soft way to reduce effects of common bands. For example, a high score is generated to correspond with bands that are in a small number of references of a reference index and a low score is applied to bands that are featured in many references.

Content matching systems often use a fixed index that is periodically refreshed with new data via an index generation process. Because no fingerprint can perfectly identify data in all cases, the index generation process includes safeguards to minimize collisions in a single index bin. Collisions occur, for example, when a hash function maps two or more index keys to the same hash value, and occur more frequently as members of large sets of data are mapped to a shorter bit string. Safeguarding can be achieved by discarding or throwing away entire bands, or "down sampling," in which one in every N number of entries are stored or kept within the overcrowded band.

In cases where live reference ingestion processes time sensitive events (e.g., live sporting events), little time is available to wait or perform stopping for a subsequent index refresh, and thus, time sensitive content is often added directly in a memory index. After a period of time, the content can then be removed from the memory index since it is saved in a recently generated index, which is downsampled. However, continuous addition and removal of data is difficult and expensive to apply band stopping or down sampling.

As disclosed herein, methods and systems enable execution of an index component that indexes live references of an ingestion pathway process into a reference index. A scoring component scores a set (one or more) of bands received in the live streaming infrastructure pathway via a set of inverse document frequency (IDF) weighting scores and stores the set of bands with the IDF weighting scores in the reference index. To score the set of bands the scoring component down scores a subset of the set of bands via the IDF weighting scores to reduce a weight of entries within the subset of bands exceeding a predetermined threshold.

Non-Limiting Examples of Systems for IDF Weighting of LSH Bands for Live Reference Ingestion Turning now to FIG. 1, illustrated is an example system 100 for media content matching in accordance with various aspects described in this disclosure. The system 100 includes a live streaming infrastructure 102 that ingests and/or processes live media feeds for video references that are time sensitive (e.g., live sports events). The live streaming infrastructure 102 includes ingestion infrastructure 104, origin infrastructure 106, content distribution network 108, and a stream/event control application programming interface ("API") 110, for example.

The ingestion infrastructure 104 receives incoming media feeds and processes the live feeds in an ingestion pipeline. Origin infrastructure 106 operates to save the live media streams to memory, and prepare the live streams of media content for delivery to the content distribution network 108, which delivers the live media content stream to any number of media players, digital storage devices and/or any other client system. In addition, the stream control API 110 provides the ability to start and/or stop an event, configure monetization settings, and in general manage the set of broadcast events and their lifecycle.

The origin infrastructure 106 includes a media matching component 112 that operates to receive or ingest a live stream such as a sample media content stream (e.g., video/audio content stream) and matches at least a part of the media content stream with known or newly uploaded media content (e.g., reference files) against it, even while the stream is in progress. The media content, for example, can include video data such as a live video performance of a sporting event uploaded to a media hosting service, and the media matching component 112 can identify the video by determining a set of reference videos that are similar to the sporting event. For example, a video can include a live performance or a recorded event featuring an original performer. Although the media matching component 112 is illustrated as part of the live streaming infrastructure for processing references that are time sensitive (e.g., live events), the media matching component 112 can be integrated with other systems that are not live, such as fingerprinting schemes or matching systems that are not time sensitive or live.

The media matching component 112 includes a fingerprinting component 114, and an identification component 116. The fingerprinting component 114 determines, provides, or otherwise generates an identifier or fingerprint using features included in the media content stream. For example, in one implementation, characteristic features can be used to generate a fingerprint, such as audio features that can include melodic characteristics of the media content.

As an alternative to or in addition to matching at least a part of the media content stream with known uploaded media content, as discussed above, the identification component 116 can determine whether any references or reference files are similar to the sample media content, and recognizes, categorizes, or otherwise identifies the reference files that are similar to the media received using the fingerprint generated by the fingerprinting component 114. In one implementation, the identification component 116 compares the fingerprint, or a portion of the fingerprint, for the media content against a set of fingerprints 120 (or identifiers) for references, and determines a set of references (media files) that are similar to the media content received (probe content) based at least in part on a set of similarity criteria. The similarity criteria can include but are not limited to satisfying a predetermined similarity threshold.

As an additional or alternative example, the identification component 116 can employ the fingerprint to lookup reference files that are similar to the media content received. For instance, the fingerprint can include a set of hash values, and the identification component 116 can employ the set of hash values to lookup a fingerprint in the set of fingerprints 120 for a reference file, e.g., using a hash table. It is to be appreciated that although the set of fingerprints 120 are illustrated as being maintained in a data store 118, the set of fingerprints 120 can be maintained in another location and the identification component 108 can access the set of fingerprints 120, for example, via a network connection.

Figure 2:
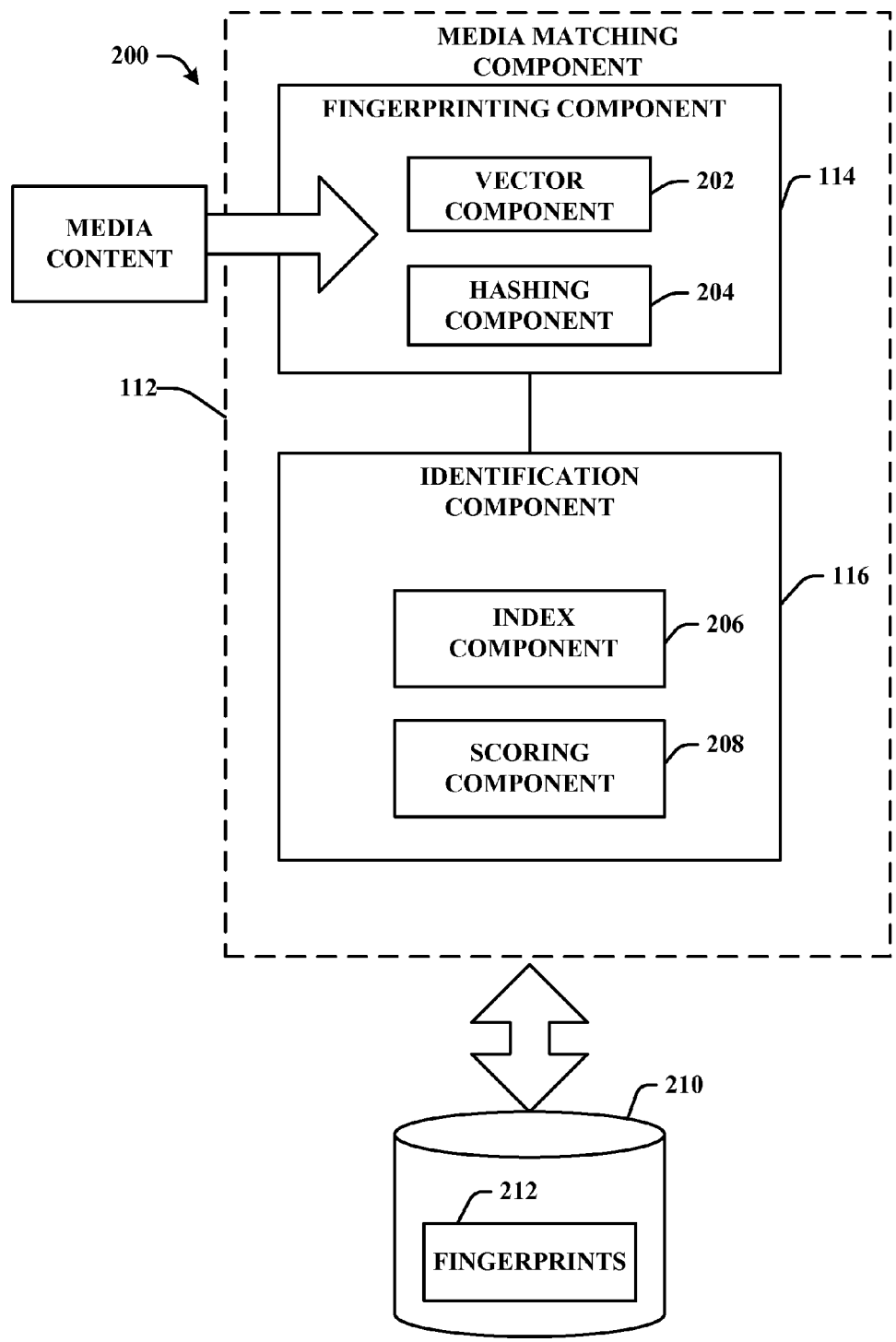
FIG. 2 is a block diagram illustrating an example, non-limiting embodiment of a system with a matching media component in accordance with various aspects and implementations described herein.

FIG. 2 illustrates an example system 200 having a media matching component 112 that includes the fingerprinting component 114 and the identification component 116 in accordance with various aspects described in this disclosure. As discussed above, the fingerprinting component 114 generates an identifier or fingerprint that represents media content using features included in the media content, such as auditory features, spatial features, image features and other such features of the media content. For example, the fingerprint includes a bit vector that can represent the spatial, temporal and/or structural characteristics of a portion or an entirety of the media content. The fingerprinting component 114 includes a vector component 202 and a hashing component 204. The vector component 202 determines, generates, or otherwise computes a set of vectors in the media content received according to the features of the media content such as at a set of predetermined times and/or predetermined time intervals.

The hashing component 204 determines, calculates or otherwise computes a fingerprint for the media content that can include a set of sub-fingerprints. The fingerprint and sub-fingerprints can represent the media content (e.g., a video) based on its content features so that minor variations due to compression, de-compression, noise, frame rate, start and stop time, source resolutions and so on do not significantly affect the fingerprint.

In one embodiment, a fingerprint is generated for each time-localized segment of the media content (e.g., one fingerprint for every 0.25 seconds of video). Each segment (and its corresponding fingerprint) is identified by a fingerprint identifier identifying the video and an offset into the video of the segment. The offset, for example, can be a time offset that indicates the position of the segment in the media content.

The fingerprints and/or sub-fingerprints from a probe video, for example, can be used to lookup references (reference media content), such as video/audio files in a set of hash tables that are similar, or identical, to the media content. For example, in one implementation, each sub-fingerprint includes a set of hash values corresponding to the respective vector generated by the vector component 202. The hashing component 204 can employ various hash functions in connection with computing the hash values including but not limited to LSH processes such as weighted min-wise independent permutations locality sensitive hashing (MinHash), for example.

In addition, the fingerprinting component 114 generates a fingerprint for the media content by combining the sub-fingerprints (or hash values) corresponding respectively to different input vectors generated for the media content. The size, dimension or length of the fingerprint is generally based on the length of the references of the media content (e.g., fingerprints and/or sub-fingerprints for the media content). Further, the media content references can be varied in dimension from one another, such as by various lengths, for example.

The identification component 116 receives fingerprints from the fingerprinting module 114 and/or from an external source. The identification component 116 is operable to determine whether zero or more reference audio files are similar to or match the sample media content received, and to identify the similar reference media content (e.g., video/audio files) using the sub-fingerprints generated by the fingerprinting component 114. The identification component 116 includes an index component 206 and a scoring component 208 that operate to identify media content references.

In one embodiment, the index component 206 generates an index for references of the media content based on the received reference fingerprints such as sub-fingerprints (or hash values) from the fingerprinting component 114. Indexing reference fingerprints provides an efficient mechanism for finding and retrieving a particular fingerprint (or corresponding video segment) based on characteristics of the fingerprint. For example, the index component 206 can sub-sample entries in a reference index 210 having references/fingerprints 212. The sub-sampling of entries can limit the number of results received from the reference index 210 when a lookup is performed on the reference index 210. For example, the reference fingerprints 212 can be indexed into the reference index 210 using a Locality Sensitive Hashing (LSH) process, in which each fingerprint is referenced by a reference identifier indicating the corresponding reference video and segment (e.g., time offset) represented in the fingerprint. For example, a fingerprint comprises a sequence of values (e.g., 100 byte values per fingerprint) that are divided into a number of LSH bands (band 0, band 1, etc.) with each band corresponding to a subset of values in the fingerprint. For example, the index component 206 can divide the fingerprints into 25 LSH bands with each band comprising four byte values, in which a set of values within an LSH band comprises a unique key, even if identical values are within a band.

The scoring component 208 operates to score a set of bands via a set of inverse document frequency (IDF) weighting scores in the reference index 210. The scoring component 208 generates a high score for bands that are featured in a small number of references and generates a low score for bands featured in a high number of references. For example, a first IDF weighting score is generated to a first set of bands that are featured in less than a first predetermined number of references, and a second IDF weighting score to a second set of bands that are featured in more than a second predetermined number of references.

In one embodiment, the scoring component 208 generates the first IDF weighting score as being greater than the second IDF weighting score, which operates as a soft way to reduce the effect of very common bands that can occur within live reference ingestion processes that have little time for index refreshing or downsampling. One example of an IDF weighting scores includes ten different reference videos. If a total number of reference videos is equal to ten thousand references, for example, such as for a media content portion or the entirety of the content, then an IDF score is generated as Log 10,000/10=3, and if a band includes one thousand references the IDF score corresponding to the reference band is Log 10,000/1000=1. For this example, the IDF score computed indicates that one reference in a band with ten references is equivalent to three hits (e.g., reference matches) in a band with one thousand references. Thus, the scoring component 208 generates IDF weighting scores according to Log(total references)/(references per band). The IDF scoring process is applied to each index reference match generated and reduces the effect of common bands in the lookup results. While a logarithmic function of base ten is used for computation, other computational functions are also envisioned, such as a natural logarithmic function, other logarithmic base functions and/or other weighting functions other than the logarithmic functions.

In another embodiment, the IDF weighting scores can be computed based on a total number of offsets, such as with time offsets generated in the video references and/or with timed pairs of references. Determining the IDF weighting scores for the bands based on total number of offsets can be performed in response to the references having varying dimensions, such as a varying length of the references, for example.

Figure 3:
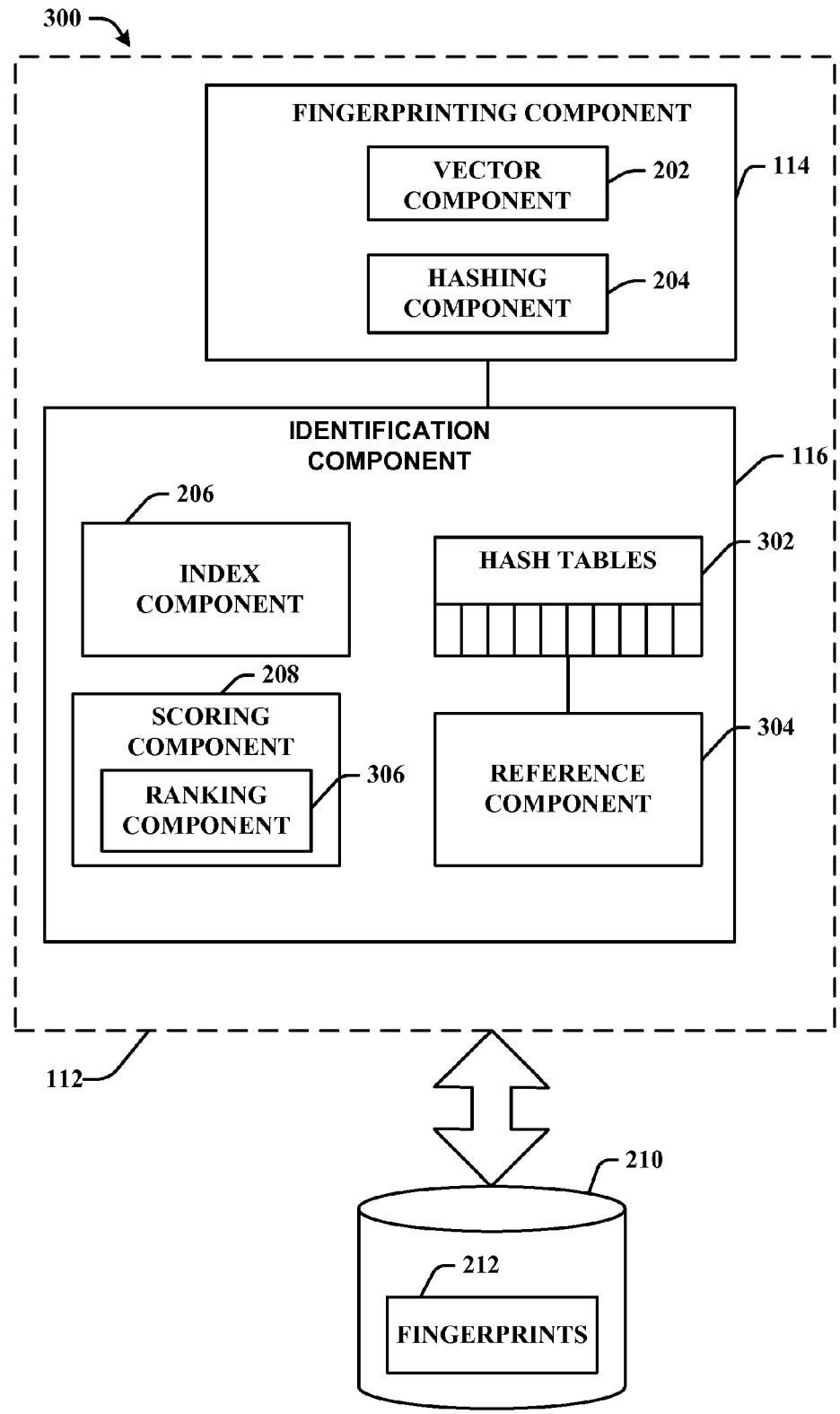
FIG. 3 is a block diagram illustrating an example, non-limiting embodiment of a system with a matching media component in accordance with various aspects and implementations described herein.

FIG. 3 illustrates another example of a media matching component 112 for a media recognition system 300 in accordance with various aspects described in this disclosure. The identification component 108 includes the index component 206, the scoring component 208, as well as a set of hash tables 302 and a reference component 304.

As discussed above, the index component 206 generates a set of bands that include a set of keys generated by the fingerprint component 114. For example, in one implementation, the index component 206 separates, partitions, or otherwise divides the bands into a set of keys based on a set of key generation criteria. The key and/or band generation criteria can include but is not limited to a predetermined quantity of bands or a predetermined band size or length. For example, the index component 206 can divide a 100-byte fingerprint into a set of 25 four-byte bands, each having a subset (key) of values in the fingerprint. In addition or alternatively, the generation criteria for the bands could vary, in which the index keys or bands vary in size, length and/or other property.

Media content (video/audio digital content) is represented by a fingerprint included in the set of fingerprints 110 (e.g., unique identifier). The reference index component 206 generates a set of reference index bands with keys for a reference (video/media content reference) using a corresponding fingerprint in the set of fingerprints 212, and inserts the reference bands into corresponding hash table index bins in the set of hash tables 302. The reference component 304 initially identifies a probe video, performs periodic lookups of LSH bands of the set of bands against the index bin from the probe video, and determines a number of media references that the first set of bands and the second set of bands are respectively featured in. For example, if a first reference video/audio content has a key value K for a first hash table, then the first reference song is inserted in bin K in the first hash table. If the first reference song has a key value C for a second hash table, then first reference song is inserted into bin C in the second hash table.

In one embodiment, the scoring component 208 includes a ranking component 306 that ranks references of video or audio content for matching bands. For example, the references are ranked according to a combined IDF weighting score from corresponding IDF weighting scores of the bands. No downsampling or stopping is therefore applied within the reference index 210, and all bands and corresponding offsets are stored within the reference index. When a probe video (received video content) that is used to probe for reference videos, is identified, regular or periodic lookups are performed against the reference index 210. For each returned or matching band, the results are analyzed by the identification component 116 and references (matching hits) within the band are counted. The scoring component 208 then computes an IDF weighting score for each band in the lookup results. Thus, instead of assigning uniform weights from references that are already downsampled, the IDF weighting scores computed by the scoring component 208 are used to vary the impact of each matching band (band hit) when performing matching of media content in the matching component 112. The ranking component 306 ranks the references within each matching band such as with a decreasing score, for example. For greater precision and a more detailed comparison of matching, only a portion of the ranked reference could be kept according to the rankings, such as a top set of N ranked references. Thus, for each reference the best sequence of matching references or hits are determined to match with the LSH bands of the video or audio probe and then further distributed.

Figure 4:
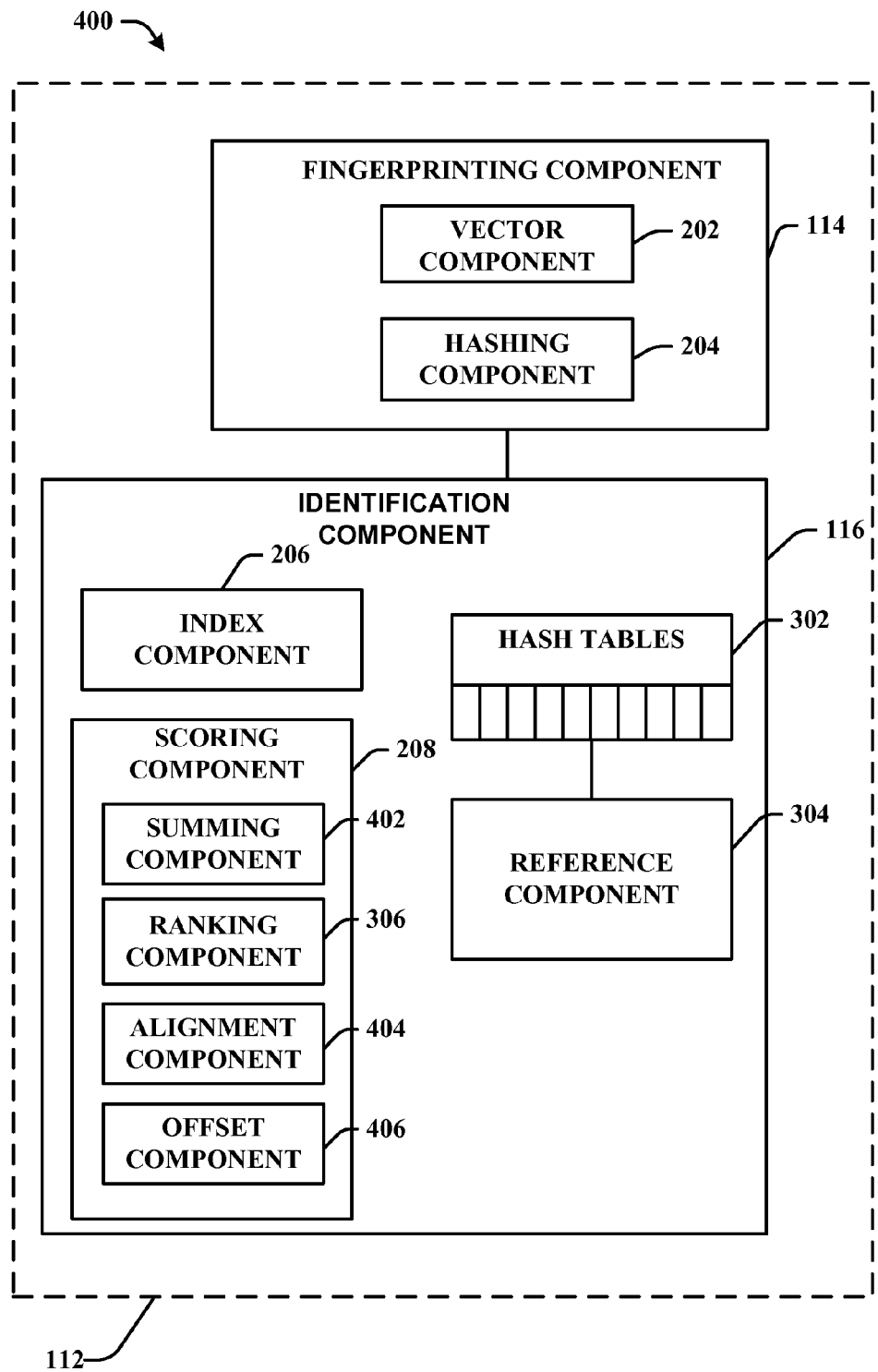
FIG. 4 is a block diagram illustrating an example, non-limiting embodiment of a system with a matching media component in accordance with various aspects and implementations described herein.

Referring to FIG. 4, illustrated is an exemplary matching system 400 in accordance with aspects disclosed herein. The system 400 comprises similar components as discussed above. The scoring component 208 further includes a summing component 402, an alignment component 404 and an offset component 406.

The summing component 402 analyzes the results of a matching search with a media probe from a live reference index or other reference index (e.g., an inverse index). The summing component 402 performs a summation of the IDF weighting scores from all of the matching bands in each reference. The ranking component 306 is then operable to rank the references according to the combined IDF scores of each band. In one example, a top tier of references can be kept or stored to obtain the best sequence of matching references that are consistent with the matching LSH bands of the media probe (e.g., a video/audio probe).

The alignment component 404 enforces an alignment, such as a time alignment constraint on the matching LSH bands. For each reference, an optimal sequence or subset of references that is consistent in time with the LSH bands in the probe can be determined. Further to counting the number of reference matches that are in common, the summing component 402 can operate with the alignment component to sum IDF scores of bands that generate a sequence of references that correspond in time with the LSH bands in the media probe. The candidate references or matching references can further be ranked by the ranking component 306 based on this more detailed IDF weighting score that corresponds with the time alignment.

The offset component 406 determines a time offset for each band of a video reference and/or a timed pairing with references. For references that can have varying lengths, the scoring component 208 is operable to compute the IDF weighting score based on the total number of offsets of a band. The index component 206 stores each band and corresponding time offset in the reference index. The IDF weighting scores thus operate to weight the impact of each band reference when performing matching based on the timing offset. For example, as a probe video is identified, periodic lookups against the reference index are performed and matching results are obtained as lookup results.

For each resulting band, the results are analyzed and a number of references in that band are counted. Each band is weighted according to IDF weighting scores that are computed based on timing offsets of the bands. For example, a total number of offsets and a number of offsets in a band are determined. As a result, an IDF weighting score is able to be computed for each band in references that can have varying lengths.

Figure 5:
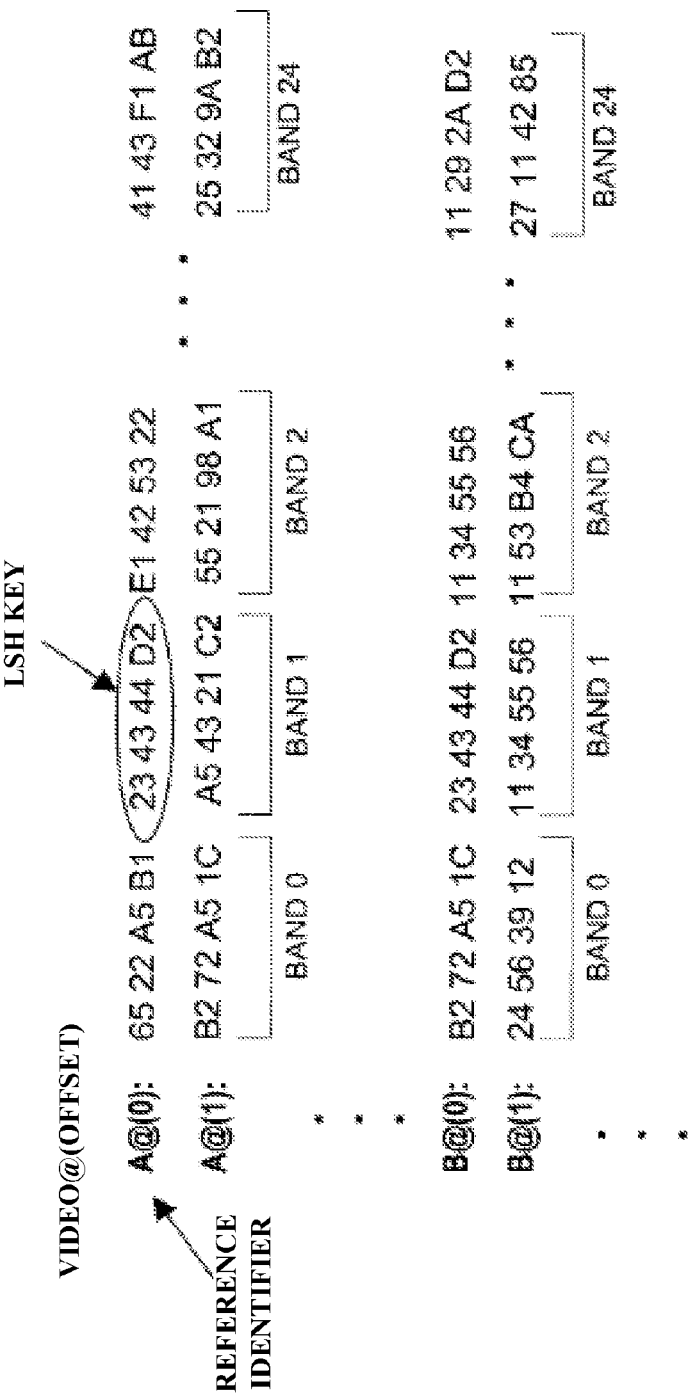
FIG. 5 illustrates examples of reference fingerprints that are indexed according to a Locality Sensitive Hashing (LSH) process in accordance with various aspects and implementations described herein.

FIG. 5 illustrates examples of reference fingerprints 500 for indexing according to an LSH process. Each fingerprint is referenced by a reference identifier indicating the corresponding reference video and segment represented by the fingerprint. For example, fingerprint A@(0) identifies a fingerprint representing the segment of video A at an offset index 0, A@(1) identifies a fingerprint representing the segment of video A at an offset index of 1, and so on. Each fingerprint comprises a sequence of values (e.g., 100 byte values per fingerprint). The sequence of values is divided into a number of LSH bands (band 0, band 1, etc.) with each band corresponding to a subset of values in the fingerprint. For example, LSH band 0 comprises the first four values of the fingerprint; LSH band 1 comprises the next four values of the fingerprint, and so on. In one embodiment, the indexing component 206 divides the fingerprints into 25 LSH bands with each band comprising four byte values. The set of values within a given LSH band is referred to as a "key". For example, fingerprint A@(0) contains the key (23, 43, 44, D2) in LSH band 1. The keys in different LSH bands are considered to be unique keys, even if they contain identical values.

FIG. 6 illustrates an embodiment of a reference index 210, for example, that stores sets of reference identifiers in LSH "bins" based on the keys contained in the respective fingerprints identified by the reference identifiers. In a given LSH band, each unique fingerprint key in that band is associated with a different bin in the reference index 120. Each bin stores all reference identifiers corresponding to fingerprints that contain the key associated with that bin. For example, the reference index 120 indicates that the key (65 22 A5B1) is found in band 0 of the fingerprints A@(0), C@(7), C@(142), C@(156), and so on. The keys in different bands have separate bins (and are considered different keys) even if the keys contain identical values. For example, the key 602 in band 1 having values (11 34 55 56) has a separate bin from the key 604 in band 2 having the identical values.

Figure 7:
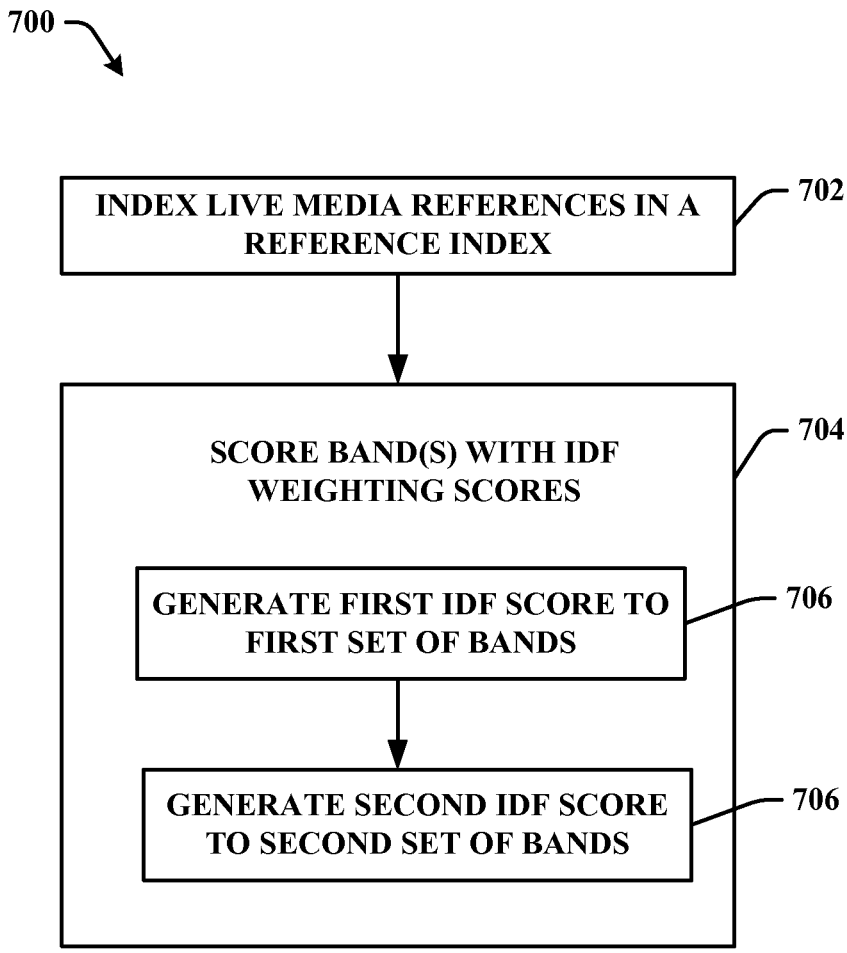
FIG. 7 illustrates a flow diagram of an example, non-limiting embodiment for processing live video streams and selecting segments in accordance with various aspects and implementations described herein.
Figure 8:
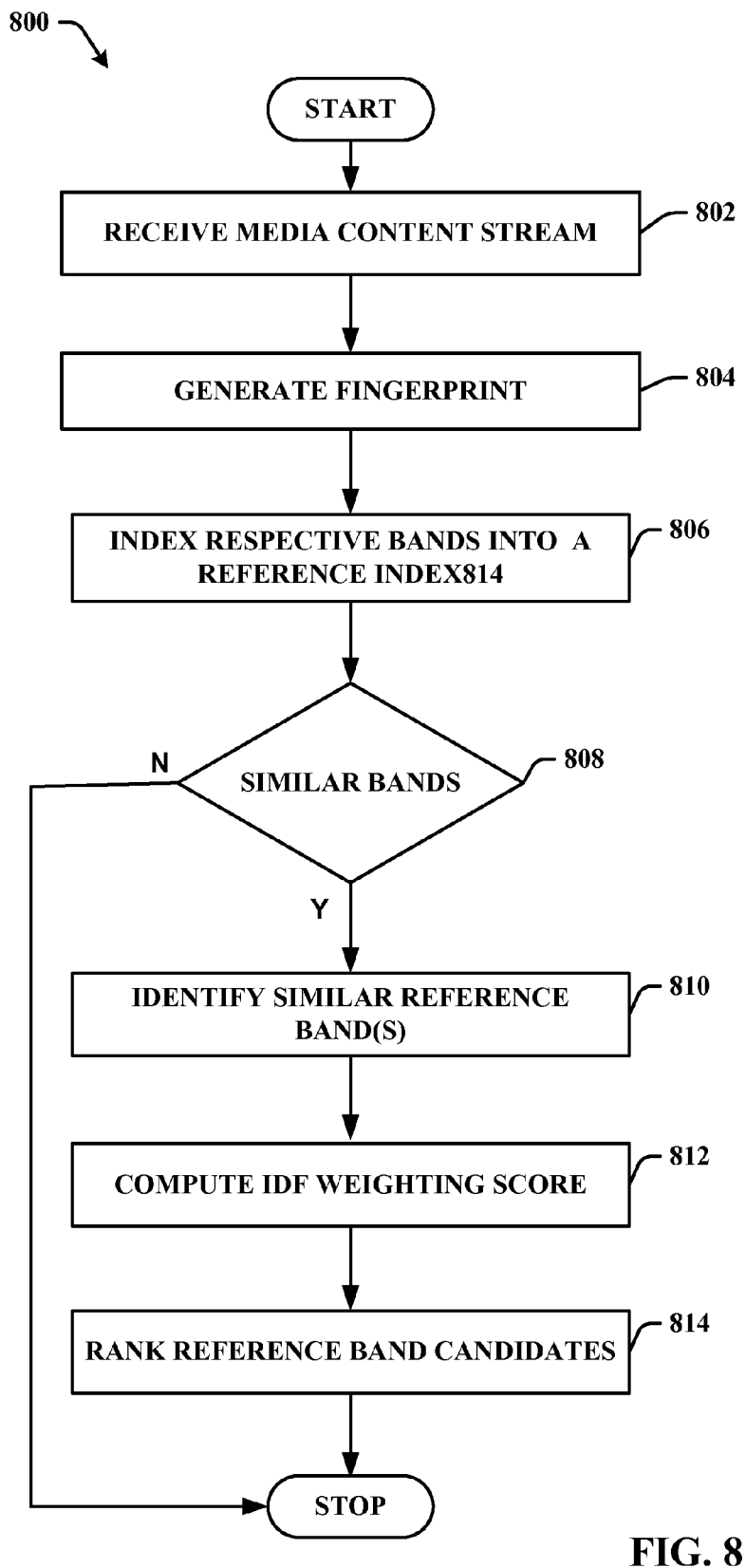
FIG. 8 illustrates a flow diagram of an example, non-limiting embodiment for live media streams in accordance with various aspects and implementations described herein.

Non-Limiting Examples of Methods for IDF Weighting of LSH Bands for Live Reference Ingestion FIGS. 7-8 illustrate various methodologies in accordance with the disclosed subject matter. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Referring now to FIG. 7, illustrated is an example methodology 700 for a matching system using LSH bands in accordance with various aspects described in this disclosure. At reference numeral 702, video references are indexed in a reference index. For example, reference fingerprints can be indexed into a reference index using a Locality Sensitive Hashing (LSH) process, in which each fingerprint is referenced by a reference identifier indicating the corresponding reference video and segment (e.g., time offset) represented by the fingerprint.

At 704, a set of bands are scored with a set of IDF weighting scores in the reference index. For example, a fingerprint comprises a sequence of values (e.g., 100 byte values per fingerprint) that are divided into a number of LSH bands (band 0, band 1, etc.) with each band corresponding to a subset of values in the fingerprint. For example, the index component 206 can divide the fingerprints into 25 LSH bands with each band comprising four byte values, in which a set of values within an LSH band comprises an index key.

At 706, a first IDF score is generated to correspond to a first set of bands. The first set of bands includes band references, for example, in less than a first predetermined number of references. At 708, a second IDF score is generated to a second set of bands that have a band references in more than a second predetermined number of references. The scoring, for example, includes down scoring a subset of the set of bands via the IDF weighting scores to reduce a weight of entries within subsets of bands exceeding a predetermined threshold. In the first set of bands a low score is high score is generated for these bands that feature a small number of references and in the second set of bands therefore a higher score is generated for bands that are in many references. For example, IDF weighting score can includes ten different reference videos. If a total number of reference videos comprises ten thousand references, for example, then an IDF score is generated as Log 10,000/10=3 for the one or more bands having ten different reference videos. Likewise, if a band includes one thousand references the IDF score corresponding to the reference band is Log 10,000/1000=1. For this example, the IDF score computed indicates that one reference in a band with ten references is equivalent to three hits (e.g., reference matches) in a band with one thousand references. Thus, the scoring component 208 generates IDF weighting scores according to Log(total references)/(references per band). The IDF scoring process is applied to each index reference match generated and reduces the effect of common bands in the lookup results.

Referring now to FIG. 8, illustrated is an example methodology 800 for a matching system in accordance with various aspects described in this disclosure. The method includes receiving a media content stream, at 802, which can be from a live ingestion process for a live event or performance. At 804, a fingerprint or identifier of the media content is generated. For example, a fingerprint (e.g., a set of sub-fingerprints) of the media content is generated using features included in the media content (e.g., using the fingerprinting component 114).

At 806, live media references are indexed in a reference index, such as a live reference index within a live streaming infrastructure pathway. For example, bands can be indexed into hash tables included in a set of hash tables (e.g., using the identification component 116). At reference numeral 808, a determination is made whether there is at least one reference band is similar to the sample media content (e.g., using the identification component 116) based on a set of similarity criteria. The similarity criteria can include but is not limited to having a quantity of keys corresponding to a reference audio file. Additionally or alternatively, the similarity criteria can include having a quantity of N sub-fingerprints that match a reference video or audio content, where a sub-fingerprint matches a reference band if a set of M consecutive keys match the reference song, where N and M are integers. For instance, N can be a quantity of sub-fingerprints corresponding to a thirty-second interval of a sample band. If it is determined that there is at least one similar reference band (Y at reference numeral 808), then at reference numeral 810, the at least one similar reference band is identified. Returning to reference numeral 808, if it is determined that there are no similar reference bands (N at reference numeral 808), then the methodology terminates.

At 812, a set of bands (e.g., one or more bands) is scored with the scoring component 208 with a set of inverse document frequency (IDF) weighting scores. The set of bands can be further stored with the IDF weighting scores in the reference index. In one embodiment, the scoring includes down scoring a subset of the set of bands via the IDF weighting scores to reduce a weight of entries within the subset of bands exceeding a predetermined threshold.

For example, a first IDF weighting score is computed to a first set of bands of the set of bands that have a first predetermined number of band references in less than a first predetermined number of references. Additionally, a second ID weighting score is computed to a second set of bands that have a second predetermined number of the band references in more than a second predetermined number of references. The scoring component 208 can be used to compute IDF weighting scores according to Log(total references)/(references per band). The IDF scoring process is applied to index reference matches to reduce the effect of common bands in the lookup results.

At 814, the reference matches or candidates are further ranked. A set of reference bands are generated that correspond in time with Locality Sensitive Hash (LSH) bands of a video probe, for example. As part of the ranking, a summation of the IDF weighting scores can be performed (e.g., using the summing component 402) for the references within each band. Then, a subset of the LSH bands can be kept, in which the subset is a top N references, and a subset of the LSH bands can be stored and/or distributed based on the associated ranking.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in mechanisms as described for various embodiments of this disclosure.

Figure 9:
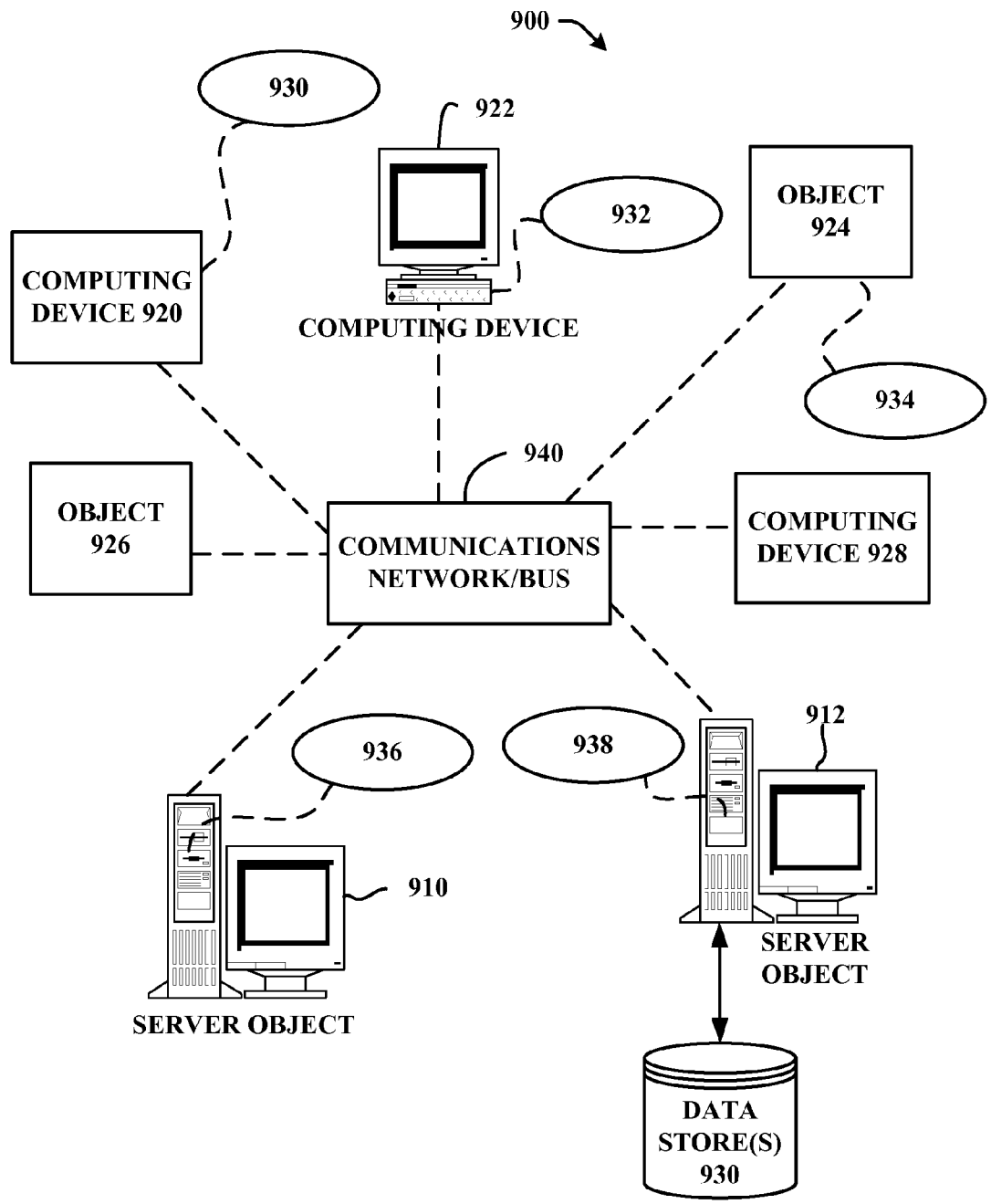
FIG. 9 is a block diagram illustrating an example computing device that is arranged in accordance with various aspects and implementations described herein.

FIG. 9 provides a schematic diagram of an exemplary networked or distributed computing environment. The distributed computing environment comprises computing objects 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects 99, 912, etc. and computing objects or devices 920, 922, 924, 926, 928, etc. may comprise different devices, such as personal data assistants (PDAs), audio/video devices, mobile phones, MP3 players, personal computers, tablets, laptops, etc.

Each computing object 910, 912, etc. and computing objects or devices 920, 922, 924, 926, 928, etc. can communicate with one or more other computing objects 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object 910, 912, etc. or computing objects or devices 920, 922, 924, 926, 928, etc. can also contain an application, such as applications 930, 932, 934, 936, 938, that might make use of an API, or other object, software, firmware and/or hardware, suitable for communication with or implementation various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be employed. The "client" is a member of a class or group that uses the services of another class or group to which it is not related. A client can be a process, e.g., roughly a set of instructions or tasks, that requests a service provided by another program or process. The client may be or use a process that utilizes the requested service without having to "know" any working details about the other program or the service itself.

In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects 99, 912, etc. can be thought of as servers where computing objects 910, 912, etc. provide data services, such as receiving data from client computing objects or devices 920, 922, 924, 926, 928, etc., storing of data, processing of data, transmitting data to client computing objects or devices 920, 922, 924, 926, 928, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network/bus 940 is the Internet, for example, the computing objects 910, 912, etc. can be Web servers with which the client computing objects or devices 920, 922, 924, 926, 928, etc. communicate via any of a number of known protocols, such as the hypertext transfer protocol (HTTP). Objects 910, 912, etc. may also serve as client computing objects or devices 920, 922, 924, 926, 928, etc., as may be characteristic of a distributed computing environment.

Exemplary Computing Device

As mentioned, advantageously, the techniques described herein can be applied to any device suitable for implementing various embodiments described herein. Handheld, portable and other computing devices and computing objects of all kinds are contemplated for use in connection with the various embodiments, e.g., anywhere that a device may wish to read or write transactions from or to a data store. Accordingly, the below general purpose remote computer described below in FIG. 10 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

Figure 10:
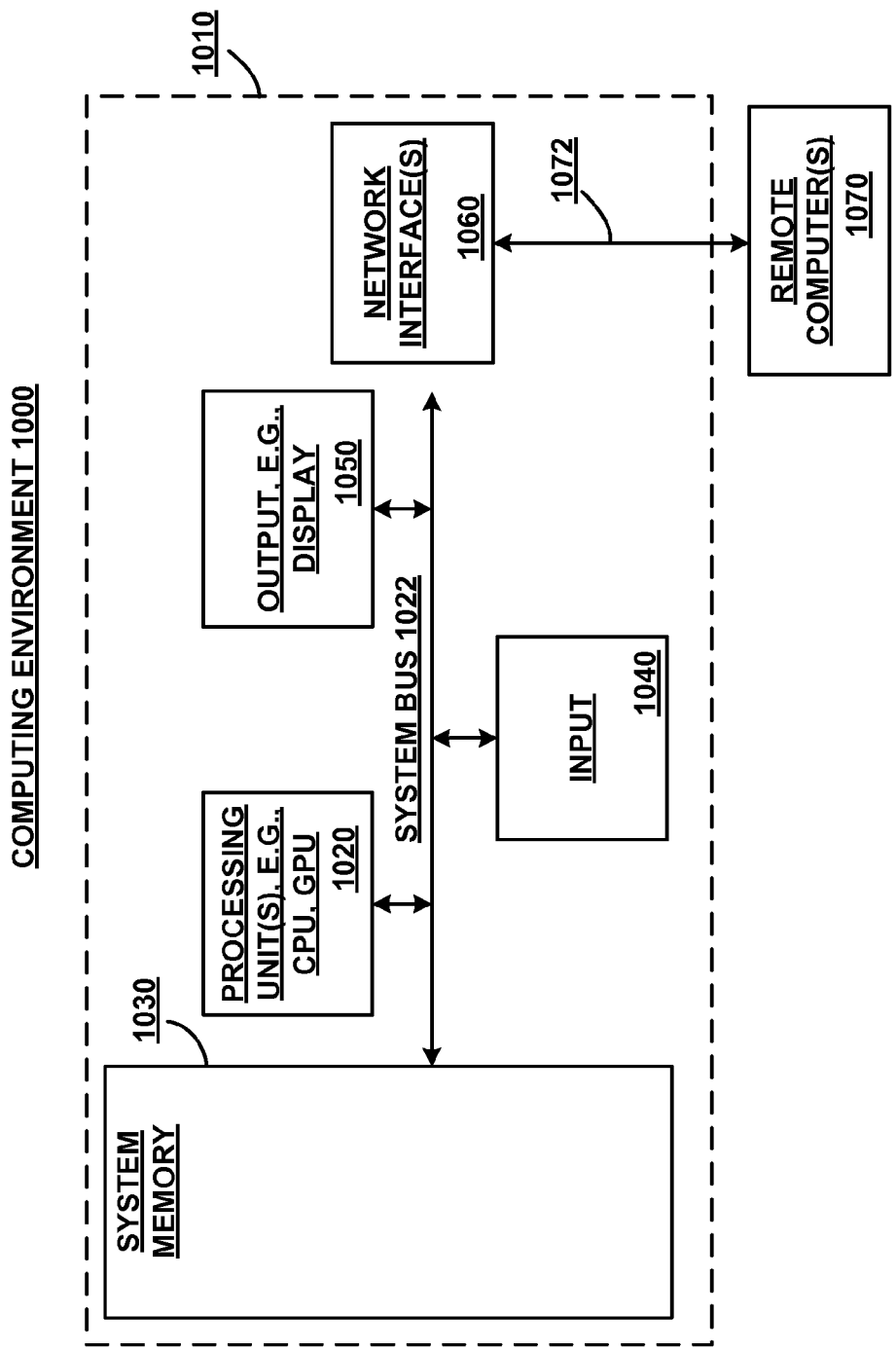
FIG. 10 is a block diagram illustrating an example networking environment in accordance with various aspects and implementations of this disclosure.

FIG. 10 thus illustrates an example of a suitable computing system environment 1000 in which one or aspects of the embodiments described herein can be implemented, although as made clear above, the computing system environment 1000 is only one example of a suitable computing environment and is not intended to suggest any limitation as to scope of use or functionality. Neither is the computing environment 1000 be interpreted as having any dependency or requirement relating to any one or combination of components illustrated in the exemplary operating environment 1000.

With reference to FIG. 10, an exemplary remote device for implementing one or more embodiments includes a general purpose computing device in the form of a computer 1010. Components of computer 1010 may include, but are not limited to, a processing unit 1020, a system memory 1030, and a system bus 1022 that couples various system components including the system memory to the processing unit 1020.

Computer 1010 includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data.

A user can enter commands and information into the computer 1010 through input devices 1040. A monitor or other type of display device is also connected to the system bus 1022 via an interface, such as output interface 1050. In addition to a monitor, computers can also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1072, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to publish or consume media in a flexible way.

The word "exemplary" is used herein to mean serving as an example, instance, or illustration. For the avoidance of doubt, this matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a component can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be affected across a plurality of devices. Accordingly, the invention is not to be limited to any single embodiment, but rather can be construed in breadth, spirit and scope in accordance with the appended claims.

What is claimed is:

1. A system, comprising:
a memory that stores computer executable components;
a processor that executes the following computer executable components stored in the memory:
an index component that indexes live references of a live streaming infrastructure process in a reference index; and
a scoring component that scores a set of bands via a set of Inverse Document Frequency (IDF) weighting scores in the reference index;
wherein the scoring component generates a first IDF weighting score to a first set of bands that are featured in less than a first predetermined number of references, and a second IDF weighting score to a second set of bands that are featured in more than a second predetermined number of references.

2. The system of claim 1, wherein the first IDF weighting score is higher than the second IDF weighting score.

3. The system of claim 1, a reference component that identifies a probe video, performs lookups of Locality Sensitive Hashing (LSH) bands of the set of bands against the reference index from the probe video, and determines a number of references of matching bands that the first set of bands and the second set of bands are respectively featured in.

4. The system of claim 3, wherein the references vary in length.

5. The system of claim 3, comprising:
a summing component that combines IDF weighting scores from the matching bands within a reference.

6. The system of claim 5, comprising:
a ranking component that ranks the references according to the combined IDF weighting scores.

7. The system of claim 6, comprising a time alignment component that determines a sequence of matching offsets from a plurality of references by applying a time alignment constraint on the matching bands.

8. The system of claim 1, comprising an offset component that determines a time offset for each video reference, wherein the index component further stores each band and corresponding time offset in the reference index.

9. The system of claim 1, wherein the scoring component down scores the second set of bands to reduce a weight of references within the second set of bands that exceed a predetermined threshold, wherein each band of the set of bands is associated with at least one IDF weighting score.

10. The system of claim 1, wherein the scoring component computes the IDF weighting scores based on a total number of offsets.

11. A method comprising:
using a processor to execute computer executable instructions stored in a memory to perform the following acts:
indexing video references in a reference index; and
scoring a set of bands via a set of inverse document frequency (IDF) weighting scores in the reference index that includes:
generating a first IDF weighting score to a first set of bands of the set of bands that have band references in less than a first predetermined number of references, and generating a second IDF weighting score to a second set of bands that have band references in more than a second predetermined number of references.

12. The method of claim 11, comprising:
summing IDF weighting scores from matching bands within references; and
ranking references according to the summed IDF weighting scores.

13. The method of claim 12, comprising:
applying a time alignments to the matching bands; and
determining a sequence of references that include rankings satisfying a predetermined threshold based on the time alignments.

14. The method of claim 11, wherein the first IDF weighting score is higher than the second IDF weighting score.

15. The method of claim 11, comprising:
identifying a probe video;

performing lookups of locality sensitive hashing (LSH) bands of the set of bands against the index bin from the probe video; and determining a number of references that the first set of bands and the second set of bands are respectively featured in.

16. The method of claim 11, comprising:

determining a time offset for the video references; and computing the IDF weighting scores based on a total number of time offsets.

17. The method of claim 11, wherein the scoring includes down scoring a subset of the set of bands via the IDF weighting scores to reduce a weight of entries within the subset of bands exceeding a predetermined threshold.

18. A method comprising:

using a processor to execute computer executable instructions stored in a memory to perform the following acts:

indexing live video references in a reference index within an live streaming infrastructure pathway; and scoring a set of bands received in the live streaming infrastructure pathway via a set of inverse document frequency (IDF) weighting scores and storing the set of bands with the IDF weighting scores in the reference index, wherein the scoring comprises down scoring a subset of the set of bands via the IDF weighting scores to reduce a weight of entries within the subset of bands exceeding a predetermined threshold.

19. The method of claim 18, comprising:

determining a set of reference bands that correspond in time with Locality Sensitive Hash (LSH) bands of a video probe;

summing the IDF weighting scores of the LSH bands that the set of reference bands are generated from;

ranking a subset of the LSH bands that generated the set of reference bands with an associated ranking; and storing the subset of the LSH bands based on the associated ranking.

20. The method of claim 18, wherein the storing comprises:

generating a first IDF weighting score to a first set of bands of the set of bands that have band references in less than a first predetermined number of references; and generating a second IDF weighting score to a second set of bands that have band references in more than a second predetermined number of references.

\* \* \* \* \*